INVENTOR
RUDOLF KREMP
FRIDOLIN HENNIG

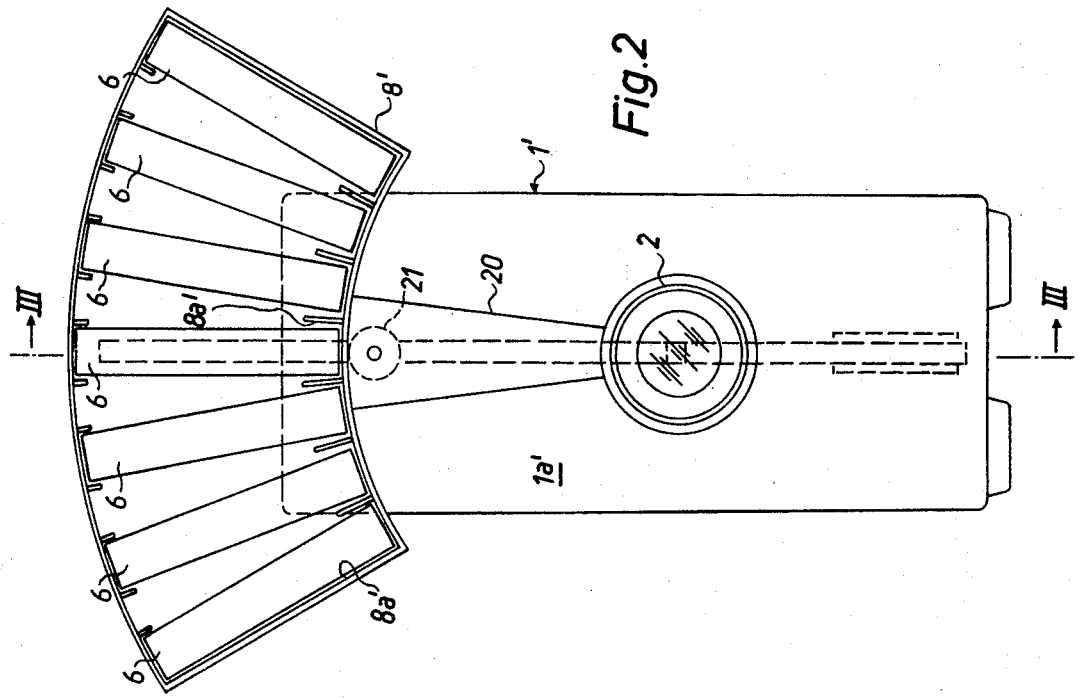
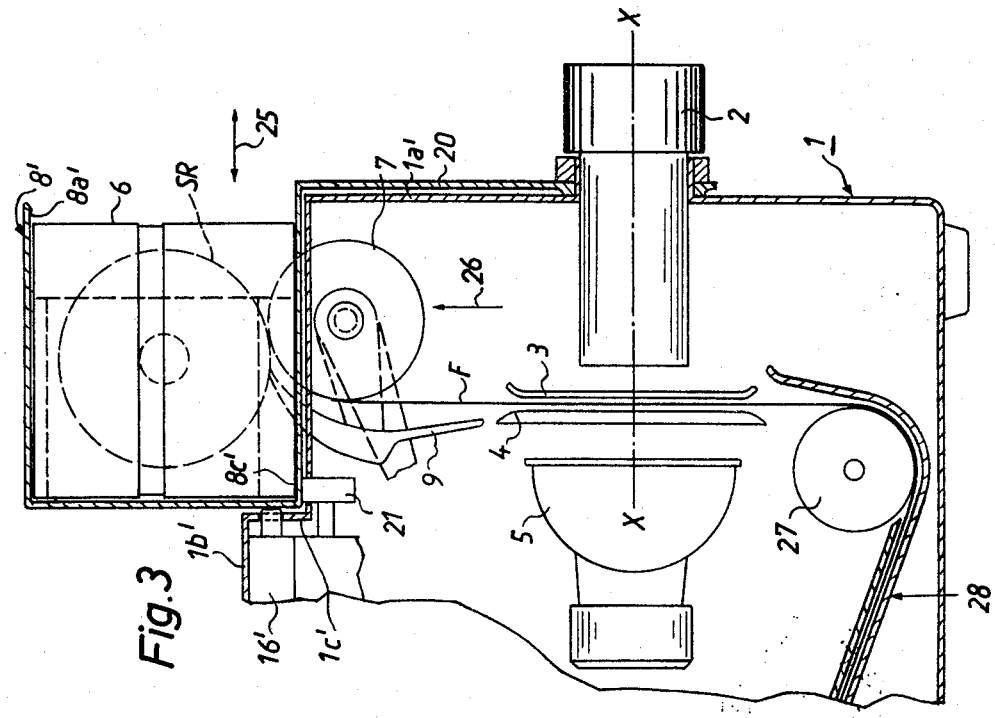

United States Patent Office 3,702,727
Patented Nov. 14, 1972

3,702,727
MOTION PICTURE PROJECTOR WITH MAGAZINE FOR FILM-CONTAINING CASSETTES
Rudolf Kremp, Grunwald, and Fridolin Hennig, Munich, Germany, assignors to Agfa-Gevaert Aktiengesellschaft, Leverkusen, Germany
Filed Mar. 1, 1971, Ser. No. 119,518
Claims priority, application Germany, Mar. 19, 1970, G 70 10 064.0
Int. Cl. G03b 21/04
U.S. Cl. 352—123                    10 Claims

ABSTRACT OF THE DISCLOSURE

The housing of a motion picture projector for 8-millimeter film has a guide channel for an arcuate magazine provided with compartments for film-containing cassettes. The magazine is movable about an axis which coincides with or is normal to the optical axis of the projection lens, and the magazine can be mounted at a level above or below the optical axis. The means for indexing the magazine can be operated by hand or by a reversible electric motor whose polarity is automatically reversed when the magazine reaches the one or the other of its end positions. The detent mechanism which serves to yieldably hold the magazine in a selected angular position in which a selected cassette occupies the projection position can further serve to automatically arrest the motor for the indexing mechanism, and the film which is being rewound onto the supply reel in the cassette which occupies the projection position actuates a switch which starts the motor to automatically index the magazine by a step.

BACKGROUND OF THE INVENTION

The present invention relates to cinematographic apparatus in general, and more particularly to improvements in motion picture projectors. Still more particularly, the invention relates to improvements in motion picture projectors of the type wherein the film whose images are to be projected onto a screen is stored in cassettes which are insertable into and removable from a magazine. The magazine is movable with reference to the housing of the projector in order to place a selected cassette into a projection position in which the film which is stored in such cassette can be transported behind the projection lens. The improved projector is especially suited for use with 8-millimeter motion picture film.

SUMMARY OF THE INVENTION

An object of the invention is to provide a motion picture projector with a novel and improved magazine for film-containing cassettes.

Another object of the invention is to provide a novel motion picture projector which can be used with the improved magazine.

A further object of the invention is to provide a simple and reliable indexing mechanism for the magazine and to construct and mount the magazine in or on the projector in such a way that the operator can gain access to and can readily exchange, insert or remove cassettes while a selected cassette dwells in the projection position, i.e., without necessitating detachment of the magazine from the housing of the projector.

An additional object of the invention is to provide a motion picture projector with a magazine which can store a desired number of film-containing cassettes or analogous containers and which occupies little room and does not adversely affect the appearance of the projector.

A further object of the invention is to provide a motion picture projector wherein a novel magazine for film-containing cassettes or like containers can be moved by a motor or by hand.

In accordance with a feature of the invention, the magazine is of arcuate shape and resembles a portion of a ring. The magazine is mounted in or on the housing of a motion picture projector for movement about an axis which coincides with or is normal to the optical axis of the projection lens.

The novel features which are considered as characteristic of the invention are set forth in particular in the appended claims. The improved motion picture projector itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 2 is a diagrammatic front elevational view of a second projector with an arcuate magazine which is movable back and forth about the optical axis of the projection lens; and FIG. 3 is a fragmentary longitudinal vertical sectional view as seen in the direction of arrows from the line III—III of FIG. 2.

DESCRIPTION OF THE PREFERRED EMBODIMENTS

Figure 1:
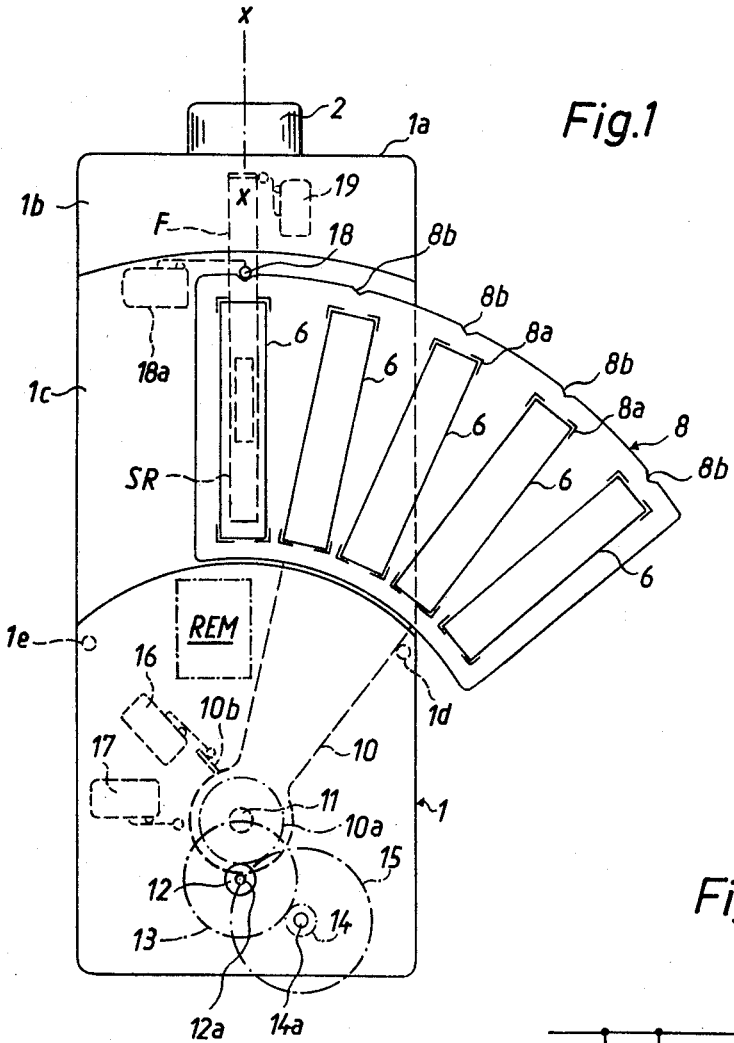
FIG. 1 is a diagrammatic plan view of a motion picture projector with an arcuate magazine which is pivotable back and forth about a vertical axis.
Figure 1A:
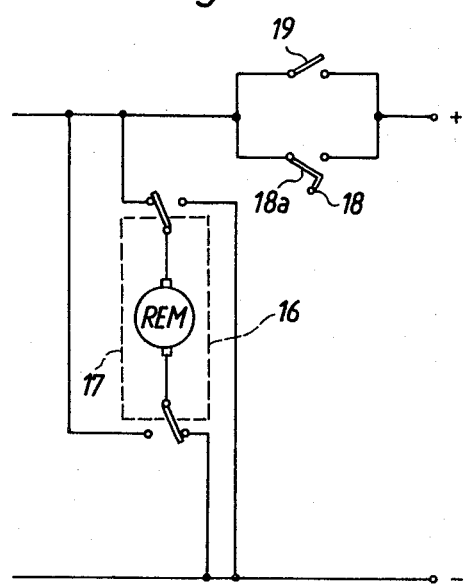
FIG. 1a illustrates the electric circuit of the motor which drives the indexing mechanism for the magazine of FIG. 1.

Referring first to FIGS. 1 and 1a, there is shown a motion picture projector which comprises a housing or frame 1 including a front wall 1a which carries a projection lens 2. The optical axis of the lens 2 is indicated at X—X. The top wall 1b of the housing 1 has an arcuate recess 1c for an arcuate magazine or tray 8 having five compartments 8a for cassettes 6 each of which contains a supply reel SR for convoluted 8-millimeter motion picture film F. The guide means for insuring that the magazine 8 moves along an arcuate path which is defined in part by the recess 1c comprises an elongated supporting arm 10 which is permanently or detachably secured to the magazine and a shaft 11 which defines a vertical pivot axis for the arm 10. The axis of the shaft 11 is normal to the optical axis X—X and coincides with the center of curvature of the magazine 8 which forms part of a ring; in the illustrated embodiment, the magazine 8 forms about one-eighth of a complete ring but it is clear that the magazine can extend along an arc of less than or more than 45 degrees.

FIG. 1 shows that the magazine 8 in that end position in which the leftmost cassette 6 assumes a projection position. In such position, an opening in the bottom wall of the leftmost cassette 6 is in registry with a conventional threading mechanism (including the parts 7 and 9 shown in FIG. 2) which can be moved from an idle or retracted position to an extended or operative position to thereby engage the outermost convolution of film F on the supply reel SR in the leftmost cassette and to automatically direct the leader of film F into a predetermined path so that the leader is automatically attached to the core of a takeup reel, not shown. The exact construction of the film threading mechanism and the manner of automatically threading the film F through the projector and of attaching its leader to the takeup reel form no part of the present invention. The bottom wall of the magazine 8 has an arcuate slot or a series of discrete openings which register with the openings in the bottom walls of the cassettes 6 so that the parts 7 and 9 of the film threading mechanism can pass through the bottom wall of the magazine and through the opening of that cassette which happens to be located in the projection position.

Each of the compartments 8a in the magazine 8 is open from above so that the operator can insert or withdraw cassettes 6 from each compartment 8a but the one which is located in the projection position. Thus, and assuming that the leftmost cassette 6 of FIG. 1 is the last cassette of a set of five cassettes which has been moved to the illustrated projection position, the operator can remove the other four cassettes while the images of frames on the film F in the leftmost cassette 6 are being projected onto a screen, not shown. The magazine 8 is then ready to be moved by a step in a counterclockwise direction, as viewed in FIG. 1, in order to place the foremost fresh cassette 6 into projection position as soon as the film F is rewound onto the supply reel SR in the leftmost cassette. Thus, the operator has ample time to replace $n-1$ cassettes while the nth cassette dwells in the projection position. Also, since the cassettes 6 are to be withdrawn or inserted from above, replacement of cassettes does not interfere with the projection of images.

The arm 10 is provided with a gear or gear segment 10a which is coaxial with the shaft 11 and forms part of a transmission which can index the magazine 8 about the axis of the shaft 11 in response to operation of a reversible electric motor REM or by hand. The gear 10a meshes with a gear 12 on an intermediate shaft 12a and the gear 12 is coaxial with and rigidly connected to a larger gear 13 which meshes with a gear 14 on a third shaft 14a. The gear 14 is rigidly connected to and coaxial with a gear or knurled or milled wheel 15 a portion of which extends from the housing 1 so that it can be rotated by hand in order to change the angular position of the magazine 8. The shaft 14a can be driven by the reversible motor REM which is in circuit with an energy source, not shown. Stops 1d and 1e are provided in the housing 1 to determine the two end positions of the arm 10. This arm further carries an actuating projection or trip 10b which is movable between two limit switches 16, 17 serving to automatically reverse the polarity of the motor REM when the magazine 8 reaches the illustrated right-hand end position (limit switch 16) or the other end position (limit switch 17). This insures that the motor REM is always ready to rotate in the proper direction when its circuit is completed by a master switch and/or by a control switch 19 which is mounted in the housing 1 adjacent to the path of the film F between the supply reel SR (in the cassette 6 occupying the projection position) and the takeup reel. When the rewinding of the film F onto the supply reel SR in the leftmost cassette 6 of FIG. 1 is completed, the tension of film F increases because its leader is still connected with the core of the takeup reel whereby the switch 19 responds to such tensioning of the film F and completes the circuit of the motor REM with a requisite delay to advance the magazine 8 by a step and to place the next cassette into the projection position. It is also possible to provide the leader of each film F with a notch or other coding means which causes or allows the switch 19 to complete the motor circuit when the coding means is detected by a scanning portion of the switch 19.

The projector of FIG. 1 is further provided with novel detent means for yieldably maintaining and locating the magazine 8 in each of five predetermined angular positions in each of which the magazine holds a different cassette 6 (i.e. a different compartment 8a) in the projection position. The detent means comprises a first portion 18 which is yieldably mounted in the housing 1 so as to normally extend into the recess 1c of the top wall 1b, and a second portion constituting the convex front wall of the magazine 8 and having a set of six equidistant notches 8b. The detent portion 18 enters one of the notches 8a whenever a cassette 6 assumes the projection position. The bias of the detent portion 18 is too weak to prevent the motor REM from moving the magazine 8 when the motor circuit is completed. In addition, the detent portion 18 preferably constitutes the movable contact of or a trip for a switch 18a which is mounted in the housing 1 and is connected in the circuit of the motor REM to open the circuit whenever the detent portion 18 enters a notch 8b. In this way, the motor REM is automatically arrested when the magazine 8 is advanced from a preceding angular position to the next angular position, either in a clockwise direction or in a counterclockwise direction.

It is clear that the magazine 8 can be mounted in or on the housing 1 at a level above or below the projection lens 2. In the embodiment of FIG. 1, the magazine 8 is located above the optical axis X—X; however, it is equally within the purview of the invention to mount the guide means for the magazine below the projection lens. The cassettes 6 are then preferably insertable into and removable from the compartments 8a through openings in the convex front wall of the magazine. The configuration of the housing 1 is then preferably selected in such a way that the operator can insert or withdraw cassettes from each compartment 8a which is not located in the projection position, at least when the magazine dwells in the one or the other end position.

FIGS. 2 and 3 illustrate a modified projector having a housing 1' with a front wall 1a' which supports a projection lens 2 and a top wall 1b' having a recess 1c' for an arcuate magazine 8' with seven equidistant compartments 8a' for cassettes 6. The center of curvature of the magazine 8' is located on the optical axis X—X of the lens 2 and the magazine is pivotable about such axis either by hand or by a reversible electric motor, not shown, which can drive a pinion 21 meshing with a rack 8c' on the concave bottom wall of the magazine. One (16') of the limit switches which change the polarity of the motor when the magazine 8' reaches the one or the other end position is shown in FIG. 3. The magazine 8' is mounted on an arm 20 which is pivotable about the optical axis X—X.

The cassettes 6 are insertable into and withdrawable from the compartments 8a' of the magazine 8' by moving in the direction indicated by a double-headed arrow 25. This direction is normal to the direction (arrow 26) of movement of the parts 7, 9 of the film threading mechanism from an idle position to the illustrated operative position. Such construction and mounting of the parts 7, 8', 9 renders it possible to properly locate the cassettes 6 without any detent means in the compartments 8a'. The part denoted by the reference character 7 is a friction wheel and the part denoted by the character 9 is a deflector which can deflect the leader of the film F in the cassette 6 occupying the projection position into a predetermined path so that the leader advances toward and is attached to the core of the takeup reel while the supply reel SR of such cassette is rotated by the friction wheel 7 in a direction to pay out the film. FIG. 3 further shows certain elements of the means which defines the path for the film F. Such elements include a window 3, a gate 4 located behind the window, a guide roller 27, and a stationary guide 28 defining a channel wherein the leader of the film F advances toward the core of the takeup reel. The gate 4 is located in front of a projection lamp 5.

In the position shown in FIG. 2, the magazine 8 is located midway between its end positions and the cassette 6 in the centrally located compartment 8a' is held in the projection position.

It is clear that the improved projector is susceptible of many additional modifications. For example, the magazine 8 or 8′ can be indexed by a mechanism which employs a rotary electromagnet. Furthermore, the magazine 8′ of FIGS. 2–3 can be mounted at the one or the other side or below the optical axis X—X of the projection lens 2. Also, the magazine 8 or 8′ need not be connected with an arm (10 or 20) but can be removably or permanently installed in suitable guide means of the housing 1 or 1′. Moreover, the projector can employ other types of known film threading mechanisms, and the electric circuit of the motor REM can be opened or completed by means other than the switches 18a, 19 of FIG. 1. Still further, the magazine 8′ of FIGS. 2–3 can be designed in such a way that its compartments 8a′ are open from above; however, the design which is shown in FIGS. 2–3 is preferred at this time because the operator is less likely to accidentally index the magazine during insertion or withdrawal of cassettes. The magazine 8′ can be mounted for pivotal movement about an axis which is parallel to the optical axis X—X of the projection lens 2.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims.

We claim:

1. In a motion picture projector, a combination comprising a housing; an arcuate magazine for film-containing cassettes; guide means provided in said housing for said magazines, said magazine being movable with reference to said guide means about an axis coinciding with the center of curvature of said magazine; detent means including cooperating first and second detent portions respectively provided on said housing and on said magazine for yieldably retaining said magazine in a plurality of predetermined angular positions in each of which a different cassette in said magazine assumes a projection position; and drive means for moving said magazine between said angular positions, said drive means comprising electric motor means and said portions of said detent means being arranged to open the circuit of said motor means whenever said magazine reaches one of said angular positions.

2. A combination as defined in claim 1, further comprising a projection lens mounted in said housing and having an optical axis which is normal to said first-mentioned axis.

3. A combination as defined in claim 1, further comprising a projection lens mounted in said housing and having an optical axis coinciding with said first-mentioned axis.

4. A combination as defined in claim 1, further comprising a projection lens mounted in said housing at a first level, said magazine being located at a second level and one of said levels being located above the other level.

5. A combination as defined in claim 1, wherein said guide means comprises an arm secured to said magazine and a shaft defining said axis and rotatably supporting said arm.

6. A combination as defined in claim 1, wherein said magazine is provided with a plurality of compartments for cassettes containing 8-millimeter film.

7. In a motion picture projector, a combination comprising a housing; an arcuate magazine for film-containing cassettes; guide means provided in said housing for said magazine, said magazine being rotatable with reference to said guide means between first and second end positions about an axis coinciding with the center of curvature of said magazine; reversible motor means for rotating said magazine; and reversing means for reversing the direction of operation of said motor means in response to placing of said magazine into either one of said end positions.

8. In a motion picture projector, a combination comprising a housing; an arcuate magazine for film-containing cassettes, said magazine having a plurality of compartments for discrete film-containing cassettes; guide means provided in said housing for said magazine, said magazine being movable with reference to said guide means about an axis coinciding with the center of curvature of said magazine, said magazine being movable about said axis between a plurality of angular positions in each of which a different compartment assumes a projection position; and film threading means movable in a first direction from an idle position to an operative position of engagement with film in the cassette occupying the compartment in said projection position, said compartments having openings for insertion and withdrawal of cassettes in a second direction which is normal to said first direction.

9. A combination as defined in claim 8, further comprising detent means including cooperating first and second detent portions respectively provided on said housing and on said magazine for yieldably retaining said magazine in a plurality of predetermined angular positions in each of which a different cassette in said magazine assumes a projection position.

10. A combination as defined in claim 9, further comprising drive means for moving said magazine between said angular positions, said drive means comprising electric motor means and said portions of said detent means being arranged to open the circuit of said motor means whenever said magazine reaches one of said angular positions.

References Cited

UNITED STATES PATENTS

| | | | |
|---|---|---|---|
| 3,508,818 | 4/1970 | Fried et al. | 352—123 |
| 3,196,455 | 7/1965 | Bavaro | 352—123 |
| 3,563,547 | 2/1971 | Marsh | 352—123 |
| 3,139,788 | 7/1964 | Hughes | 352—72 X |
| 3,550,879 | 12/1970 | Bundschuh | 352—72 X |
| 3,591,187 | 7/1971 | Ban | 352—123 X |
| 2,539,521 | 1/1951 | Owens | 242—181 |
| 3,524,949 | 8/1970 | Kleve | 352—8 X |
| 3,383,156 | 5/1968 | Fried et al. | 352—8 X |
| 3,367,590 | 2/1968 | Girard | 352—123 X |
| 3,551,037 | 12/1970 | Rammer | 352—158 X |

SAMUEL S. MATTHEWS, Primary Examiner

A. A. MATTHEWS, Assistant Examiner

U.S. Cl. X.R.

352—72, 158